United States Patent
Chau

(10) Patent No.: US 11,178,539 B1
(45) Date of Patent: Nov. 16, 2021

(54) TELEPHONE NUMBER ASSIGNMENT FOR TEXT MESSAGE COMMUNICATIONS

(71) Applicant: Zoom Video Communications, Inc., San Jose, CA (US)

(72) Inventor: Vi Dinh Chau, Seattle, WA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 17/242,970

(22) Filed: Apr. 28, 2021

(51) Int. Cl.
*H04W 8/26* (2009.01)
*H04W 4/12* (2009.01)

(52) U.S. Cl.
CPC ............... *H04W 8/26* (2013.01); *H04W 4/12* (2013.01)

(58) Field of Classification Search
CPC .................................. H04W 8/26; H04W 4/12
See application file for complete search history.

(56) References Cited

U.S. PATENT DOCUMENTS

| | | | |
|---|---|---|---|
| 7,192,235 B2 | 3/2007 | Blight et al. | |
| 8,073,431 B2 | 12/2011 | Blight et al. | |
| 8,433,294 B2 | 4/2013 | Blight et al. | |
| 8,693,655 B1 | 4/2014 | Chau et al. | |
| 9,220,000 B1 | 12/2015 | Youngs et al. | |
| 2014/0122154 A1* | 5/2014 | Kellogg | H04L 51/14 705/7.19 |
| 2015/0072651 A1* | 3/2015 | Ruttenbur | H04L 51/30 455/411 |

OTHER PUBLICATIONS

Vonage Business Communications Support, Manage Your Phone Numbers, https://businesssupport.vonage.com/articles/answer/Managing-Phone-Numbers-21561, 2 pages, Oct. 1, 2020.

* cited by examiner

*Primary Examiner* — Joseph E Dean, Jr.
(74) *Attorney, Agent, or Firm* — Young Basile Hanlon & MacFarlane, P.C.

(57) ABSTRACT

Text message communications between operator devices and service devices are enabled by the assignment of a telephone number defined for those service devices. A text message communication may be initiated by an operator device accessing a web service associated with a software platform or by the software platform itself. One of the service devices for which the telephone number is defined for use is selected, for example, based on information received as input from the operator device. The telephone number is assigned to that service device to enable the service device to participate in the text message communication with the operator device. At the conclusion of the text message communication, the telephone number is released from the service device to enable one of the other service devices to use it, for example, to continue the same text message communication or to participate in a different text message communication.

20 Claims, 9 Drawing Sheets

TELEPHONE NUMBER ASSIGNMENT FOR TEXT MESSAGE COMMUNICATIONS

BACKGROUND

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises solutions, meaning that remote workers and those who are generally increasingly mobile may be unable to rely upon them. One solution is by way of a unified communications as a service (UCaaS) platform, which includes several communications services integrated over a network, such as the Internet, to deliver a complete communication experience regardless of physical location.

SUMMARY

Disclosed herein are, inter alia, implementations of systems and techniques for telephone number assignment for text message communications.

One aspect of this disclosure is a method, which includes receiving a request for a text message communication, assigning a telephone number defined for use with one or more service devices to one of the service devices based on the request to enable the service device to use the telephone number to participate in the text message communication, and releasing the telephone number at a conclusion of the text message communication to enable one of the other service devices to use the telephone number. Use of the telephone number by other service devices of the one or more service devices is restricted while the telephone number is in use with the service device.

Another aspect of this disclosure is a system, which includes one or more service devices and a server device. A telephone number is defined for use with the one or more service devices. The server device runs software configured to assign the telephone number to one of the service devices to enable the service device to use the telephone number to participate in a text message communication, facilitate the text message communication between the service device and an operator device, and release the telephone number at a conclusion of the text message communication to enable one of the other service devices to use the telephone number. Use of the telephone number by other service devices of the one or more service devices is restricted while the telephone number is in use with the service device.

Yet another aspect of this disclosure is an apparatus, which includes a memory and a processor. The processor is configured to execute instructions stored in the memory to receive a request for a text message communication, route the text message communication to a service device based on information associated with the request in which the service device is one of one or more service devices for which a telephone number is defined for use, assign the telephone number to the service device to enable the service device to use the telephone number to participate in the text message communication, and release the telephone number at a conclusion of the text message communication to enable one of the other service devices to use the telephone number.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

A software platform, such as a UCaaS platform, includes various services enabling communications over many different modalities, including telephone calls, emails, video/chat messaging, and text messaging. Each of these modalities may be used in one or more contexts and with one or more devices. Many of these modalities may enable a communication to be sent to and/or received from multiple device operators either simultaneously or sequentially. For example, an email address may be configured as a group which directs messages sent to that email address to one or more group members having their own email addresses. In another example, a telephone call to a given telephone number, such as a main line for an office, may be routed to one of potentially hundreds of extensions.

However, the text messaging modality is different because it is generally one-to-one, meaning, that only a single device operator can use a telephone number to send and receive text messages. While this is appropriate for personal phone use, there are cases in which this presents a significant technical limitation, whether or not in connection with a UCaaS platform. For example, a telephone number may be configured as a main line for a contact center team, for a service team, or for another group of device operators to receive calls; however, that telephone number cannot be used as a single entry point for all of those device operators to receive and send text messages. Furthermore, the one-to-one limitation of the text messaging modality limits the number of people who may have visibility into historical text message communication records, for example, for auditing purposes.

Implementations of this disclosure address problems such as these by enabling text message communications between operator devices and service devices by the assignment of a telephone number defined for those service devices. A text message communication may be initiated by an operator device accessing a web service associated with a software platform or by the software platform itself. One of the service devices for which the telephone number is defined for use is selected, for example, based on information received as input from the operator device. The telephone number is assigned to that service device to enable the service device to participate in the text message communication with the operator device. At the conclusion of the text message communication, the telephone number is released from the service device to enable one of the other service devices to use it, for example, to continue the same text message communication or to participate in a different text message communication.

Figure 1:
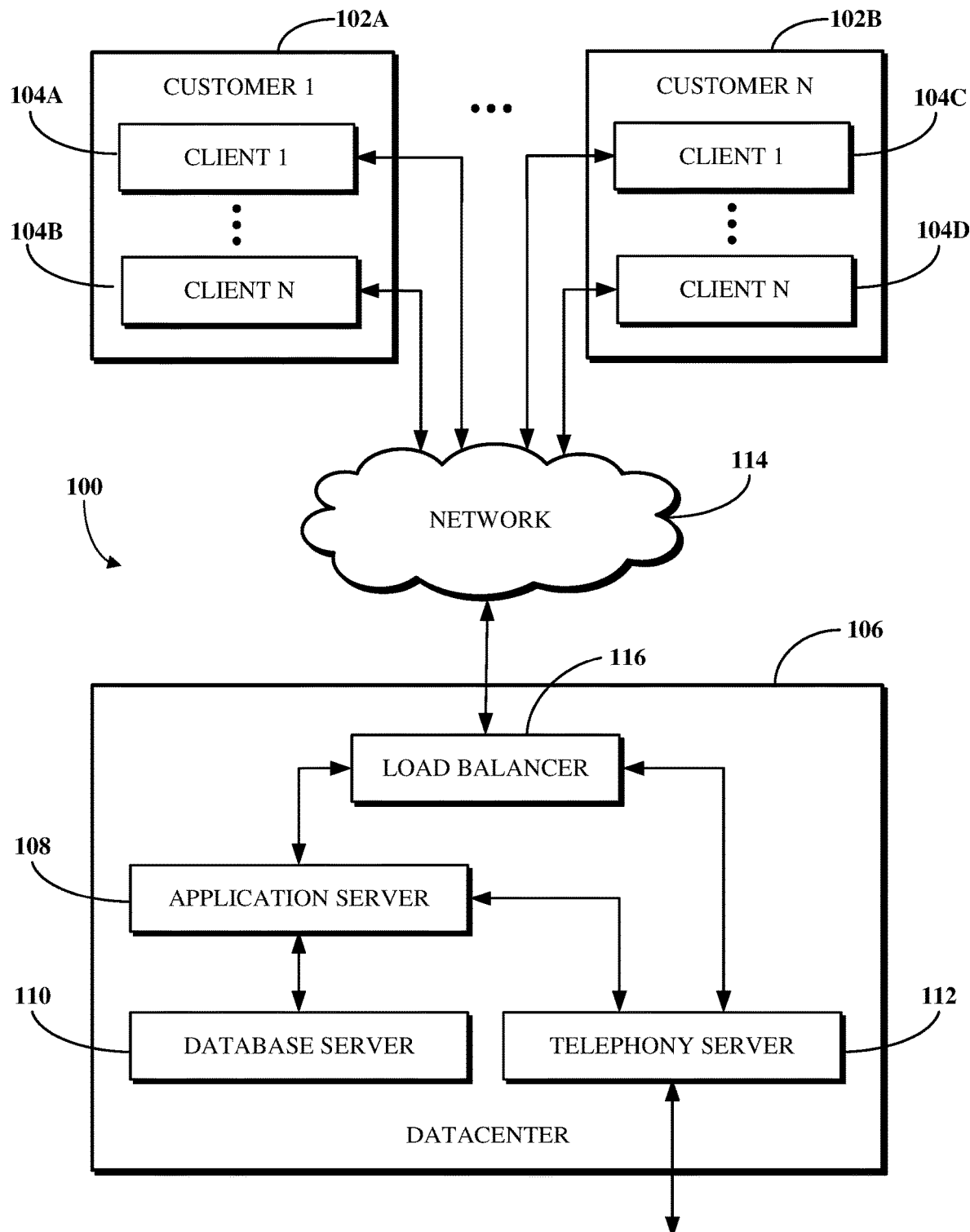
FIG. 1 is a block diagram of an example of an electronic computing and communications system.

To describe some implementations in greater detail, reference is first made to examples of hardware and software structures used to implement telephone number assignment for text message communications. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, for example, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over Internet protocol (VOIP)-enabled devices configured to send and receive calls over a network, for example, a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phones which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
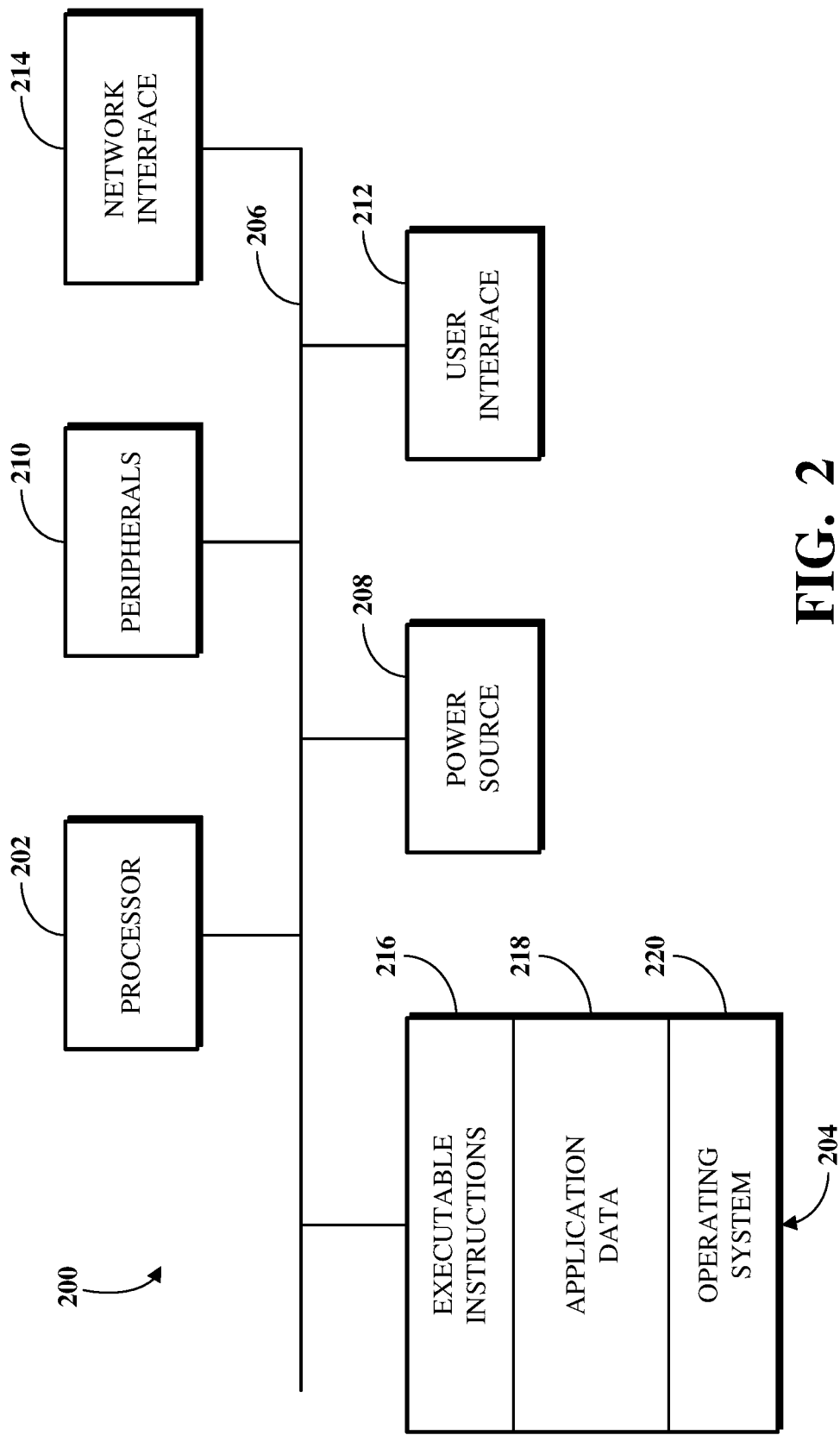
FIG. 2 is a block diagram of an example internal configuration of a computing device of an electronic computing and communications system.

FIG. 2 is a block diagram of an example internal configuration of a computing device 200 of an electronic computing and communications system, for example, a computing device which implements one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, now existing or hereafter developed, configured for manipulating or processing information. For example, the processor 202 can include multiple processors interconnected in one or more manners, including hardwired or networked, including wirelessly networked. For example, the operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory of the memory 204 can be random access memory (RAM) (e.g., a DRAM module, such as DDR SDRAM) or another form of volatile memory. In another example, the non-volatile memory of the memory 204 can be a disk drive, a solid state drive, flash memory, phase-change memory, or another form of non-volatile memory configured for persistent electronic information storage. The memory 204 may also include other types of devices, now existing or hereafter developed, configured for storing data or instructions for processing by the processor 202. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®, an operating system for a mobile device, such as a smartphone or tablet device; or an operating system for a non-mobile device, such as a mainframe computer.

The power source 208 includes a source for providing power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, ZigBee, etc.), infrared, visible light, general packet radio service (GPRS), global system for mobile communications (GSM), code-division multiple access (CDMA), Z-Wave, another protocol, or a combination thereof.

Figure 3:
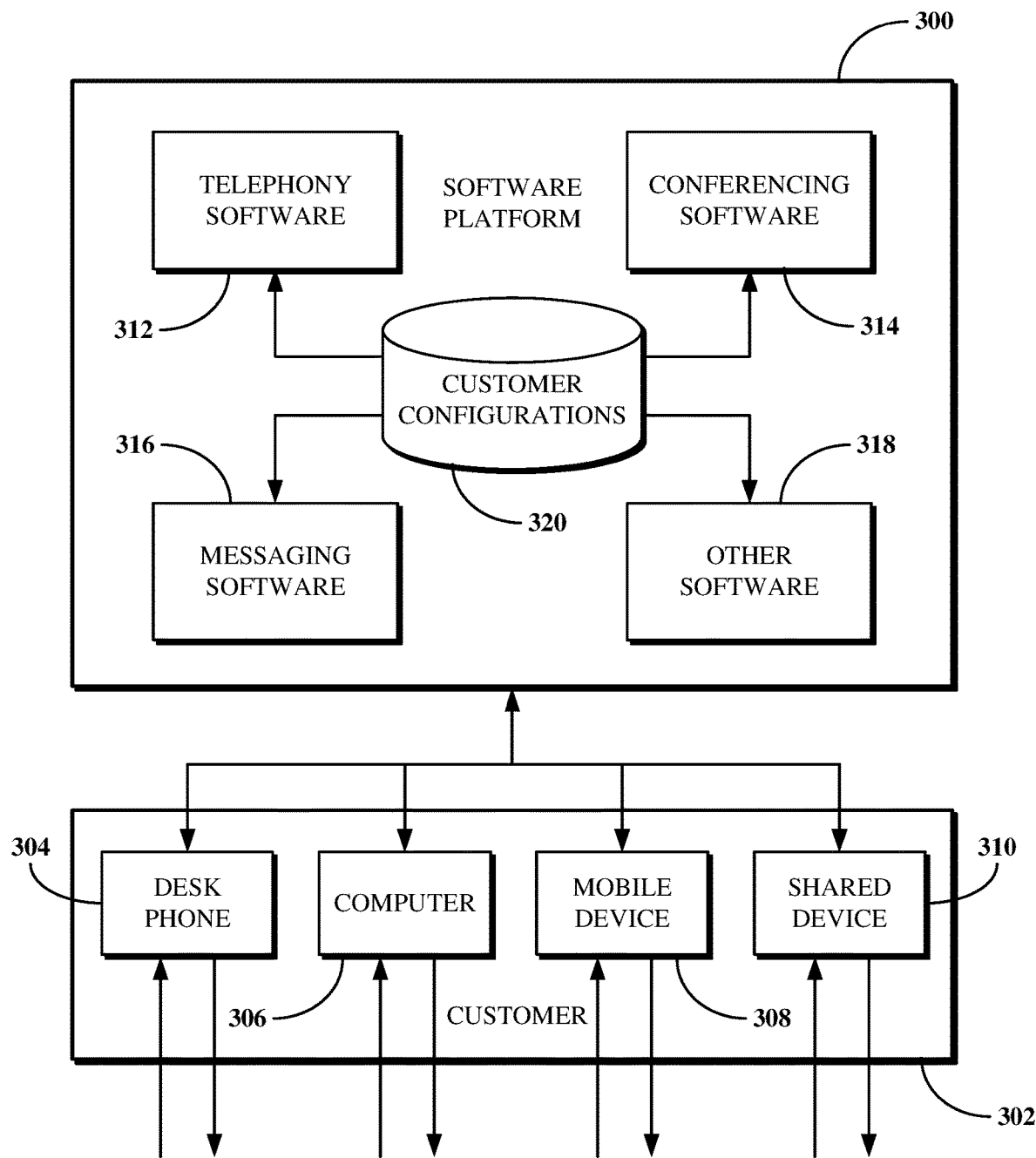
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. For example, the software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302, which may, for example, be the customer 102A, the customer 102B, or another customer, as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 312 is a desk phone, a computer, a mobile device, or a different device which may instead be configured for use by multiple specified or unspecified users Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones, multiple computers, etc.) and/or one or more clients of a client type not shown in FIG. 3 (e.g., wearable devices, televisions other than as shared devices, or the like). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 where same includes telephony features.

The telephony software 312 further enables phones which do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or like virtual conversation between users of those devices. The unified messaging functionality of the messaging software 316 may, for example, refer to email messaging which includes voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include telephone number assignment and communication software, such as to assign a telephone number to a service device to enable the service device to participate in a text message communication and further to store and manage records including information associated with text message communications.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304-310.

Figure 4:
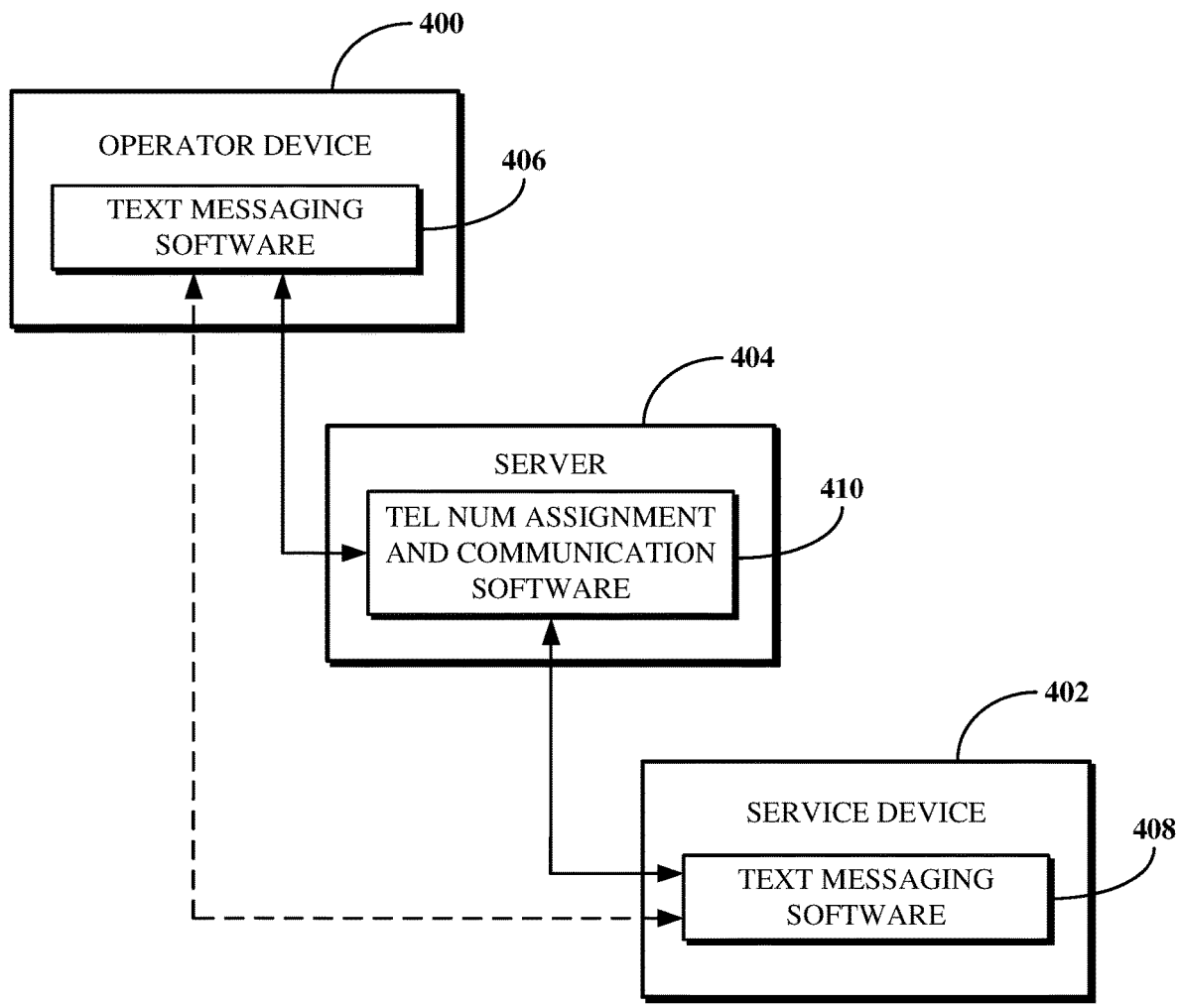
FIG. 4 is a block diagram of an example of devices used for a text message communication.

FIG. 4 is a block diagram of an example of devices used for a text message communication. A text message communication according to this disclosure may be between an operator device 400 and a service device 402. A server 404 intermediate to the operator device 400 and the service device 402 may facilitate the text message communication process and implement functionality used for same. In particular, the operator device 400 runs text messaging software 406, the service device 402 runs text messaging software 408, and the server 404 runs telephone number assignment and communication software 410.

The operator device 400 is a device configured to send and receive text messages and is operated by an operator. For example, the operator device 400 may be a mobile device, such as a cell phone, tablet, personal digital assistant, or the like. In another example, the operator device 400 may be a desktop computer or laptop computer. The operator of the operator device 400 may be a human user or an artificial intelligence aspect. For example, the operator device 400 may be one of the clients 304 to 310 shown in FIG. 3, and the operator may be a user associated with a customer of a software platform, for example, the software platform 300 shown in FIG. 3.

The text messaging software 406 running at the operator device 400 is software which enables text messages to be written at the operator device 400, transmitted from the operator device 400 to a specified telephone number, and received at the operator device 400. The text messaging software 406 may be software which is installed on a storage of the operator device 400. Alternatively, the text messaging software 406 may be software which is installed elsewhere and used at the operator device 400. For example, the text messaging software 406 may be implemented at the operator device 400 using information and/or instructions received at the operator device 400 over a network, for example, the Internet.

The service device 402 is a device configured to send and receive text messages and is operated in connection with a service associated with a software platform. In particular, the service device 402 is one of one or more service devices for which a telephone number associated with the service is defined for use. In one example, each of the one or more service devices is a device of a contact center agent. In such a case, each contact center agent may operate one or more of the service devices. In another example, each of the one or more service devices is a device of a service team member. For example, the service team may be a team of one or more device operators tasked with a particular service. In such a case, each service team member may operate one or more of the service devices.

The text messaging software 408 running at the service device 402 is software which enables text messages to be written at the service device 402, transmitted from the service device 402 to a specified telephone number, and received at the service device 402. The text messaging software 408 may be software which is installed on a storage of the service device 402. Alternatively, the text messaging software 408 may be software which is installed elsewhere and used at the service device 402. For example, the text messaging software 408 may be implemented at the service device 402 using information and/or instructions received at the service device 402 over a network, for example, the Internet.

The server 404 is a computing device configured to run the telephony number assignment and communication software 410 or a portion thereof. The telephone number assignment and communication software 410 is software for assigning the telephone number for which use is defined for the one or more service devices to the service device 402 to enable the service device 402 to use the telephone number to participate in a text message communication with the operator device 400, for facilitating the text message communication between the operating device 400 and the service device 402 such as using the text messaging software 406 and the text messaging software 408, and for releasing the telephone number from the service device 402 at a conclusion of the text message communication. The telephone number assignment and communication software 410 may, for example, be the telephone number assignment and communication software described above with respect to the other software 318 shown in FIG. 3.

Although the server 404 is shown as directly communicating with the operator device 400 and the service device 402, each of the operator device 400 and the service device 402 communicate through a PSTN, which routes messages either directly to the other device or through the server 404 as an intermediary. For example, telephony features of the operator device 400 may be implemented by a first PSTN and telephony features of the service device 402 may be implemented by a second PSTN, in which case text messages from the operator device 400 to the service device 402 are routed through the first PSTN to the second PSTN for delivery at the service device 402 and text messages from the service device 402 to the operator device 400 are routed through the second PSTN to the first PSTN for delivery at the operator device 400. In another example, telephony features of the operator device 400 and the service device 402 may be implemented by the same PSTN.

Once a connection between the operator device 400 and the service device 402 is established, the text message communication may be directly facilitated between the operator device 400 and the service device 402, for example, using a PSTN or another telephony system aspect external to the server 404. For example, a PSTN used by a telephony service provider external to the software platform may connect to a PSTN with a telephony service of the software platform to facilitate the text message communication between the operator device 400 and the service device 402. However, in some implementations, the server 404 may still be used as an intermediary to the PSTNs to deliver text messages between the operator device 400 and the service device 402.

Figure 5:
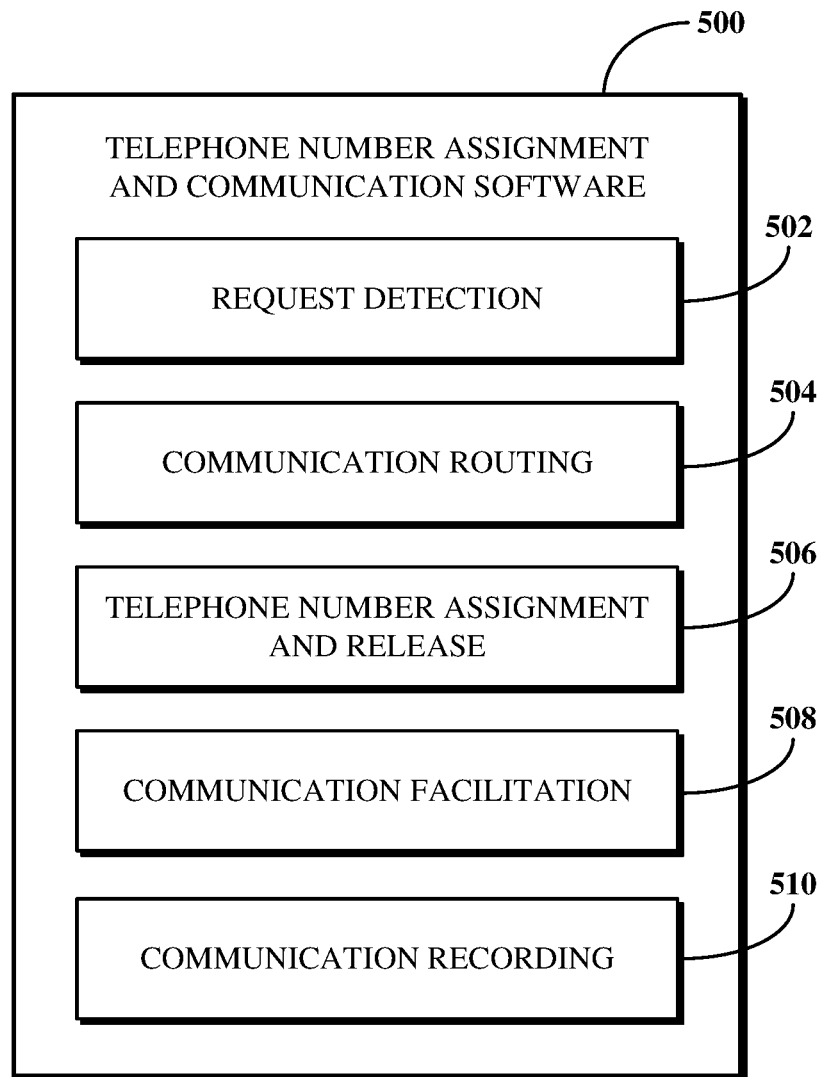
FIG. 5 is a block diagram of example functionality of telephone number assignment and communication software of a software platform.

FIG. 5 is a block diagram of example functionality of telephone number assignment and communication software 500 of a software platform, which may, for example, be the software platform 300 shown in FIG. 3. For example, the telephone number assignment and communication software 500 may be the telephone number assignment and communication software 410 shown in FIG. 4. The telephone number assignment and communication software 500 is run at a server, which may, for example, be the server 404 shown in FIG. 4.

The telephone number assignment and communication software 500 includes tools for detecting requests for text message communications, routing those requests to service devices, assigning telephone numbers for the service devices to participate in those text message communications, releasing those telephone numbers for use with other authorized service devices, facilitating text message communications, and storing records including information associated with those text message communications. As shown, the telephone number assignment and communication software 500 includes a request detection tool 502, an communication routing tool 504, a telephone number assignment and release tool 506, an communication facilitation tool 508, and an communication recording tool 510.

The request detection tool 502 detects a request for a text message communication. The request is received from an operator device, for example, the operator device 400 shown in FIG. 4. The request for a text message communication may be received in response to an operator of the operator device transmitting a text message from the operator device to a telephone number associated with a service, for example, a service associated with a software platform. The request for the text message communication is detected by determining that the request is a request for a text message communication. The request for the text message communication may, for example, be a text message received from the operator device.

The communication routing tool 504 determines a service device to which to route the request for the text message communication, for example, the service device 402 shown in FIG. 4. Determining to route the text message communication to the service device first includes determining which one or more service devices are associated with the request for the text message communication. Determining which one or more service devices are associated with the request for the text message communication can include identifying the telephone number to which the request for the text message communication was transmitted and identifying a service associated with that telephone number. The one or more service devices are associated with that service and are devices for which use of a telephone number is defined. Determining to route the text message communication to the particular service device may in at least some cases include processing information received as input from an operator device associated with the text message communication and/or information associated with the operator device. For example, information input at the operator device, such as within a text message received from the operator device, can be used to determine the service device to which to route the request for the text message communication.

The telephone number assignment and release tool 506 assigns the telephone number for which use by the one or more service devices is defined to the service device to which the request for the text message communication is routed to enable that service device to participate in a text message communication with the operator device. The telephony number assignment and release tool 506 later releases the telephone number from that service device at the conclusion of the text message communication to allow a different one of the one or more service devices to use that telephone number to participate in another text message communication, which may be a continuation of the same text message communication participated in by the earlier service device or a different text message communication with the same operator device or with a different operator device.

The communication facilitation tool 508 facilitates a text message communication between an operator device and a service device. For example, the communication facilitation tool 508 may facilitate a text message communication with the operator device from which the request for the text message communication is received and the service device to which the request for the text message communication is routed. For example, the communication facilitation tool 508 may in some cases represent an interface, a channel, or another aspect between text messaging software running at the operator device, for example, the text messaging software 406 shown in FIG. 4, and text messaging software running at the service device, for example, the text messaging software 408 shown in FIG. 4. Facilitating the text message communication can include directly exchanging text messages of the text message communication between the operator device and the service device. Alternatively, facilitating the text message communication can include providing information usable to establish a connection between the operator device and the service device to a PSTN of a telephony service provider associated with the operator device.

The communication recording tool 510 stores information associated with the text message communication within a record associated with the telephone number for which use by the one or more service devices is defined. The record includes information associated with one or more text message communications participated in by any of the one or more service devices using the telephone number. For example, the record may be some set of information which includes portions of text message communications or entire text message communications participated in using the telephone number from some point in the past to the present. Storing the information associated with the text message communication may include updating the record where such a record associated with the telephone number already exists. Alternatively, storing the information associated with the text message communication may include generating such a record where no such record associated with the telephone number exists.

In some implementations, the telephone number assignment and communication software 500 may include other tools in addition to and/or instead of the tools 502 through 510. Although the tools 502 through 510 are shown as functionality of the telephone number assignment and communication software 500 as a single piece of software, in some implementations, some or all of the tools 502 through 510 may exist outside of the telephone number assignment and communication software 500 and/or the software platform may exclude the telephone number assignment and communication software 500 while still including the some or all of tools 502 through 510 in some form elsewhere.

Figure 6:
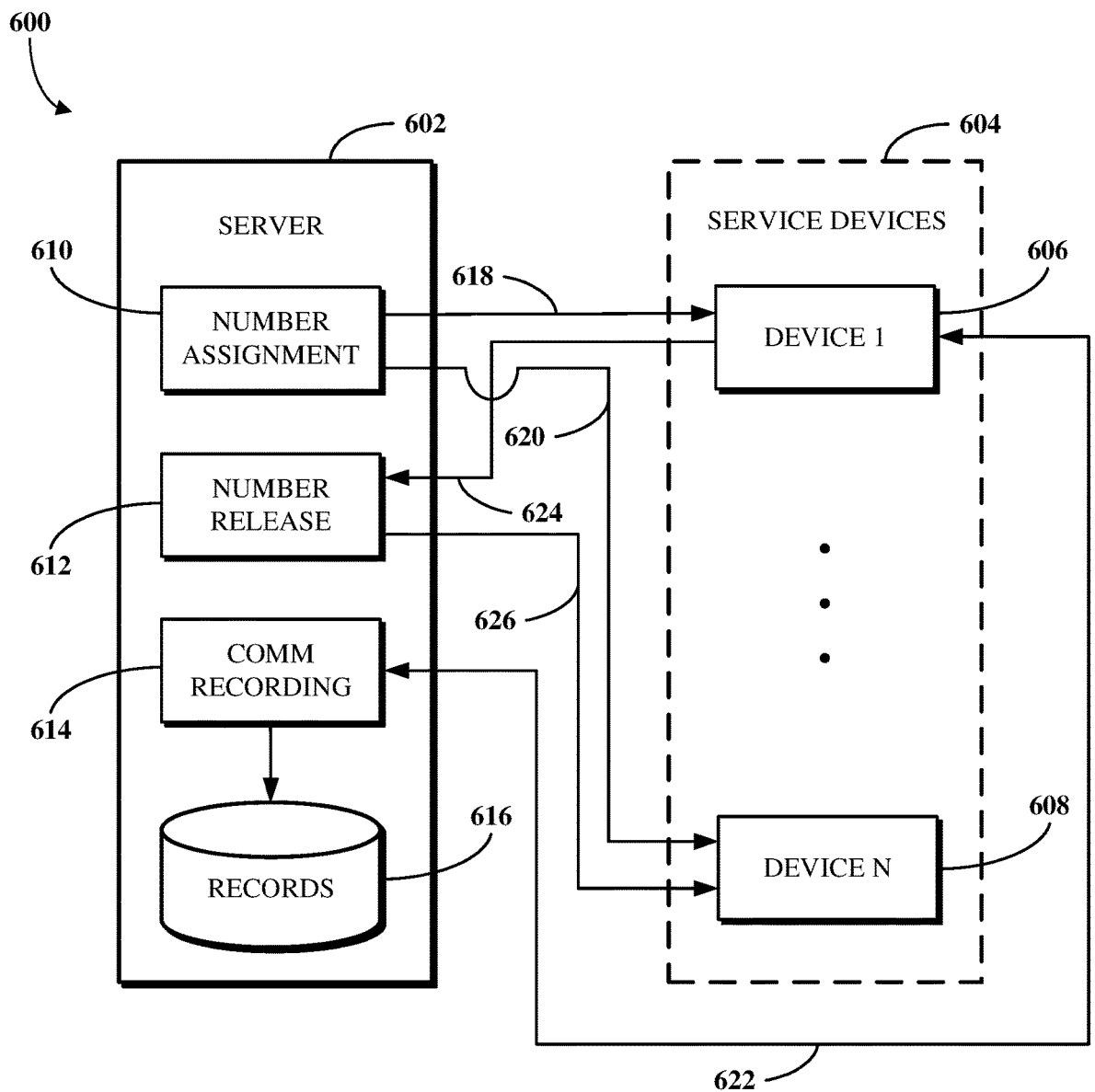
FIG. 6 is a block diagram of an example of a system for telephone number assignment for text message communications.

FIG. 6 is a block diagram of an example of a system 600 for telephone number assignment for text message communications. The system 600 includes a server 602 and service devices 604. The service devices 604 includes one or more service devices, such as a device 1 606 through a device N 608 in which N is an integer greater than or equal to 1, for which the use of a telephone number for text message communications is defined. The server 602 is a server, for example, the server 404 shown in FIG. 4, which includes a number assignment aspect 610, a number release aspect 612, a communication recording aspect 614, and a data store 616. The number assignment aspect 610, the number release aspect 612, and the communication recording aspect 614 may, for example, be aspects of the telephony number assignment and communication software 500 shown in FIG. 5, for example, the telephone number assignment and release tool 506 and the communication recording tool 510.

After software at the server 602 detects a request for a text message communication and determines to route the request for the text message communication to a service device, in this case, device 1 606, the number assignment aspect 610 assigns the telephone number to the service device 1 606 to enable the service device 1 606 to participate in the text message communication with an operator device from which the request is received. The telephone number is assigned over a transmission 618 to the device 1 606 which causes the device 1 606 to be configured to use the telephone number to participate in the text message communication. The number assignment aspect 610 sends an indication 620 to the other service devices 604, such as to the device N 608, that the telephone number is in use and thus cannot be used by those other service devices 604 until it is released. In some implementations, the indication 620 may be omitted. For example, the other service devices 604 can access a portal or other software aspect to determine that the telephone number is currently assigned to the device 1 606 and thus not available for assignment to the other service devices 604 until it is released.

Once the text message communication starts, such as with the assignment of the telephone number to the device 1 606, the communication recording aspect 614 opens a channel with the device 1 606 or alternatively with one or more telephony services involved in facilitating the text message conversation between the device 1 606 and the operator device. The communication recording aspect 614 collects data indicative of text messages included in the text message communication. The collected data includes the content of the text messages, the party which transmitted the text messages, the date and time at which the text messages were transmitted and/or received, and the like. In some implementations, the collected data further includes media shared by one or both parties to the text message communication. For example, the collected data may include one or more of images, video files, audio files, or other media transmitted from the device 1 606 to the operator device or vice versa.

When the text message communication between the device 1 606 and the operator device concludes, an indication 624 of the conclusion is transmitted to the server 602 to trigger a release of the telephone number from the device 1 606 using the number release aspect 612. Upon releasing the telephone number, the number release aspect 612 may send an indication 626 to the other service devices 604, such as to the device N 608, that the telephone number has been released and is thus available for assignment to one of those other service devices 604. In some implementations, the indication 626 may be omitted. For example, the other service devices 604 can access a portal or other software aspect to determine that the telephone number is available for assignment after it is released from the device 1 606.

The communication recording aspect 614 detects or is otherwise informed as to the conclusion of the text message communication and stores information associated with the text message communication within a record of the data store 616. The data store 616 is a data store, database, repository, or other storage which stores records associated with telephone numbers which may be assigned to various service devices to enable those service devices to participate in text message communications with various operator devices. In particular, one such record stored in the data store 616 is associated with the telephone number used by the device 1 606 for the text message communication described above, and it is within that record that the information associated with the text message communication is stored. The information associated with the text message communication which is stored in the record includes text messages transmitted by either party during the text message communication. In some implementations, the information associated with the text message communication which is stored in the record further includes media shared by either party during the text message communication.

In some implementations, an auditing device may be used to audit a record stored in the data store. For example, the audit may include a review of one or more text message communications participated in by one or more service devices using a subject telephone number. The audit may be used to verify a course of action taken by a service device operator during a text message conversation, to review the dialogue of such a text message conversation, for other purposes, or a combination thereof.

Figure 7:
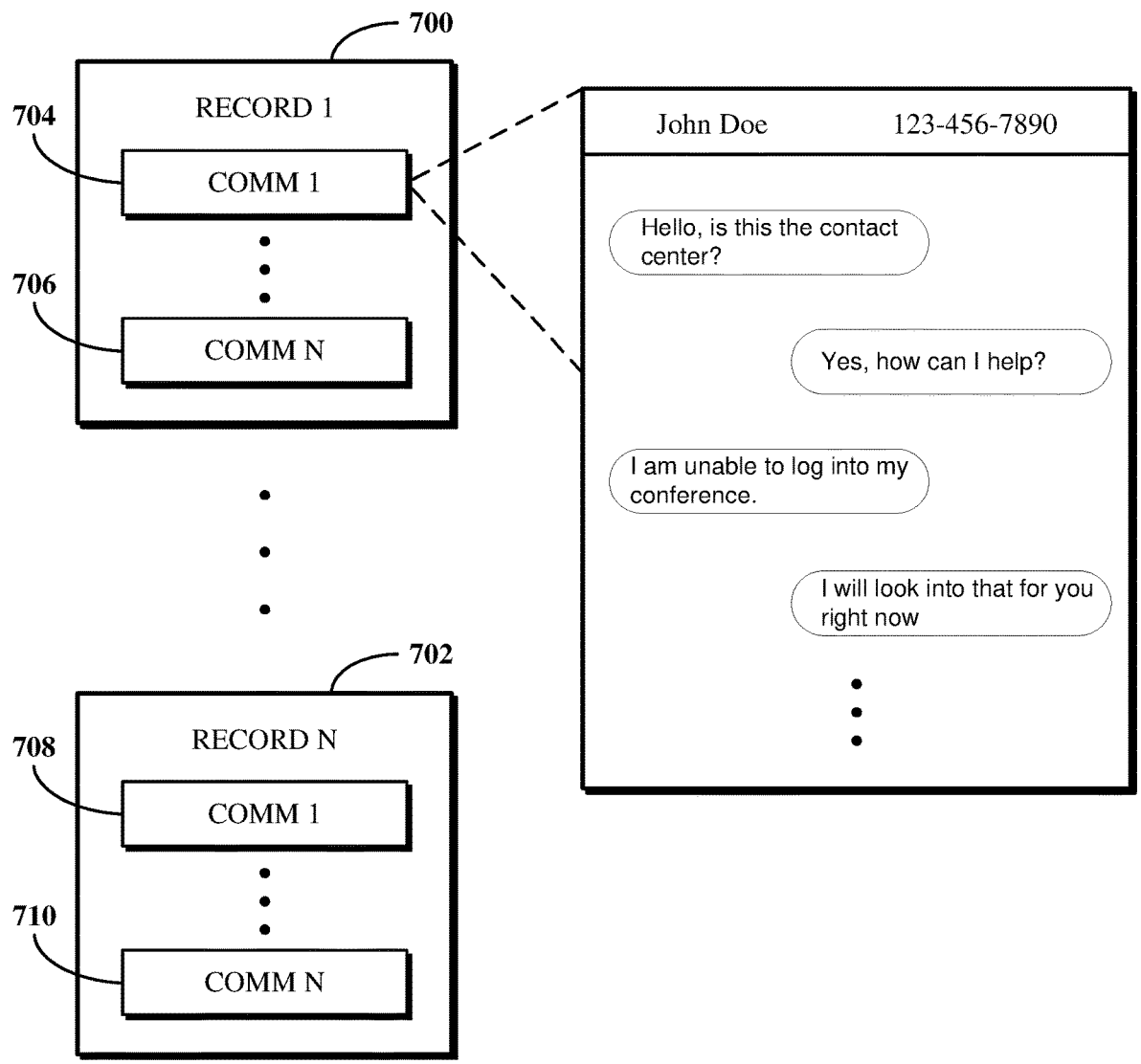
FIG. 7 is an illustration of an example text message communication stored within a record.

FIG. 7 is an illustration of an example text message communication stored within a record. One or more records, including a record 1 700 through a record N 702 in which N is an integer greater than or equal to 1, are stored in a data store, for example, the data store 616 shown in FIG. 6, and include portions of or entire text message communications participated in by one or more service devices using subject telephone numbers. In particular, the record 1 700 may be associated with a first telephone number used for one or more text message communications including a communication 1 704 through a communication N 706 in which N is an integer greater than or equal to 1, and the record N 702 may be associated with a second telephone number used for one or more text message communications including a communication 1 708 through a communication N 710 in which N is an integer greater than or equal to 1. An example of contents of the communication 1 704 of the record 1 700 are shown in which a service device operated by a contact center agent is participating in the subject text message communication with an operator of an operator device asking for help logging into a conference, for example, using the conferencing software 314 shown in FIG. 3.

Figure 8:
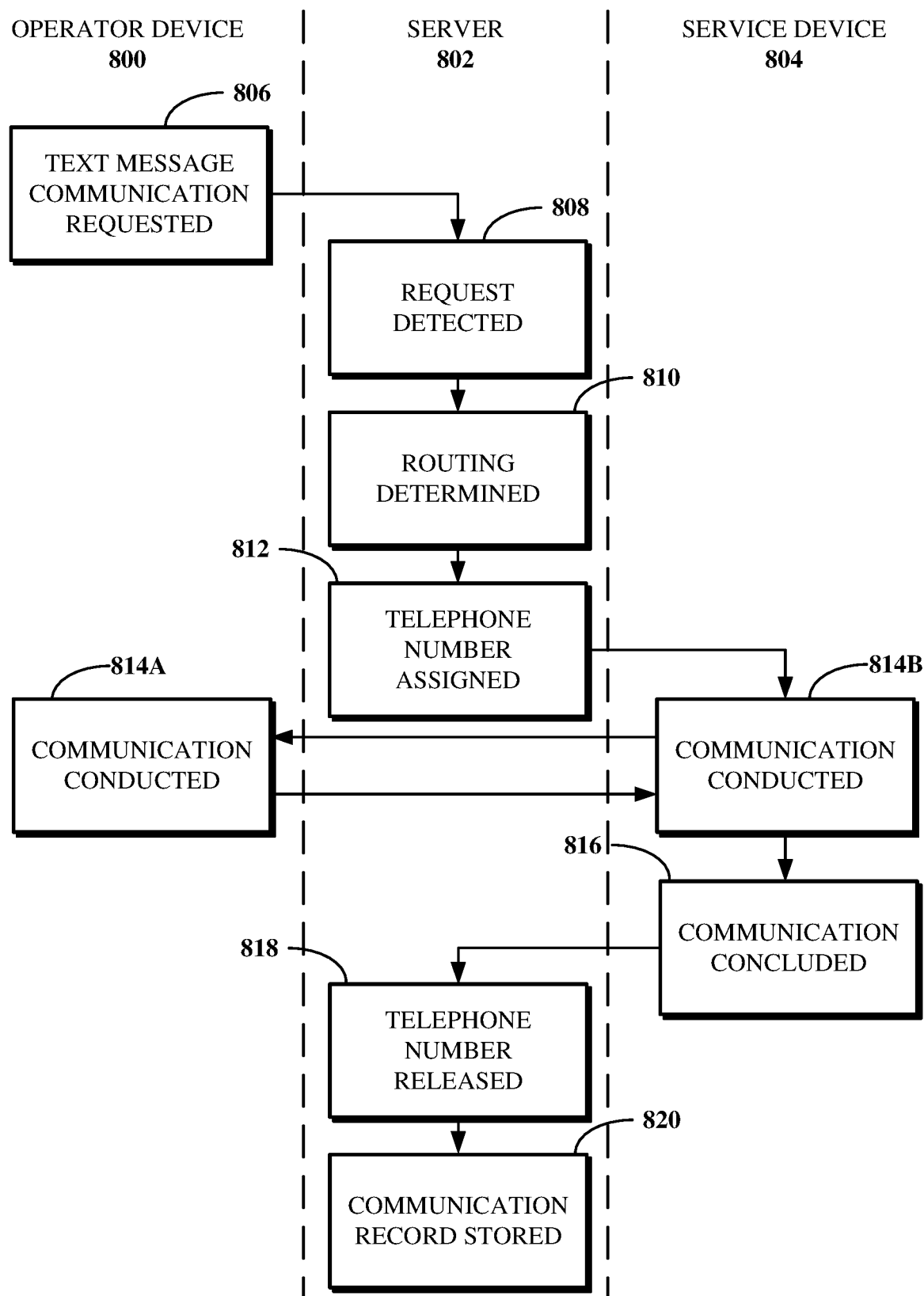
FIG. 8 is an illustration of swim lanes showing an example sequence of operations performed for telephone number assignment for text message communications.

FIG. 8 is an illustration of swim lanes showing an example sequence of operations performed for telephone number assignment for text message communications, in particular, between an operator device 800, a server 802, and a service device 804. The operator device 800, the server 802, and the service device 804 may, for example, respectively be the operator device 400, the server 404, and the service device 402 shown in FIG. 4.

At 806, a request for a text message communication is initiated at the operator device 806 and transmitted to the server 802. At 808, the server 802 detects the request for the text message communication. At 810, the server determines to route the request for the text message communication to a particular service device for which use of a telephone number is defined. At 812, the telephone number is assigned to the service device to enable the service device to participate in the text message communication.

At 814A and 814B, the text message communication is conducted between the service device 804 and the operator device 800. The text message communication may, for example, be facilitated by the server 802 as an intermediary to the operator device 800 and the service device 804. Alternatively, the text message communication may not be facilitated by the server 802. For example, the text message communication may be between the service device 804 and the operator device 800 and facilitated by one or more PSTNs, such as a PSTN which implements telephony and text messaging services for the service device 804 and a PSTN which implements telephony and text messaging services for the operator device 800. In some cases, those PSTNs may be the same.

At 816, the text message communication is concluded 816. At 818, the telephone number is released from the service device 804 to enable another service device for which the telephone number is defined to use it, such as to continue the same text message communication with the operator device 800 or for another text message communication. At 820, a record of the text message communication is stored.

Figure 9:
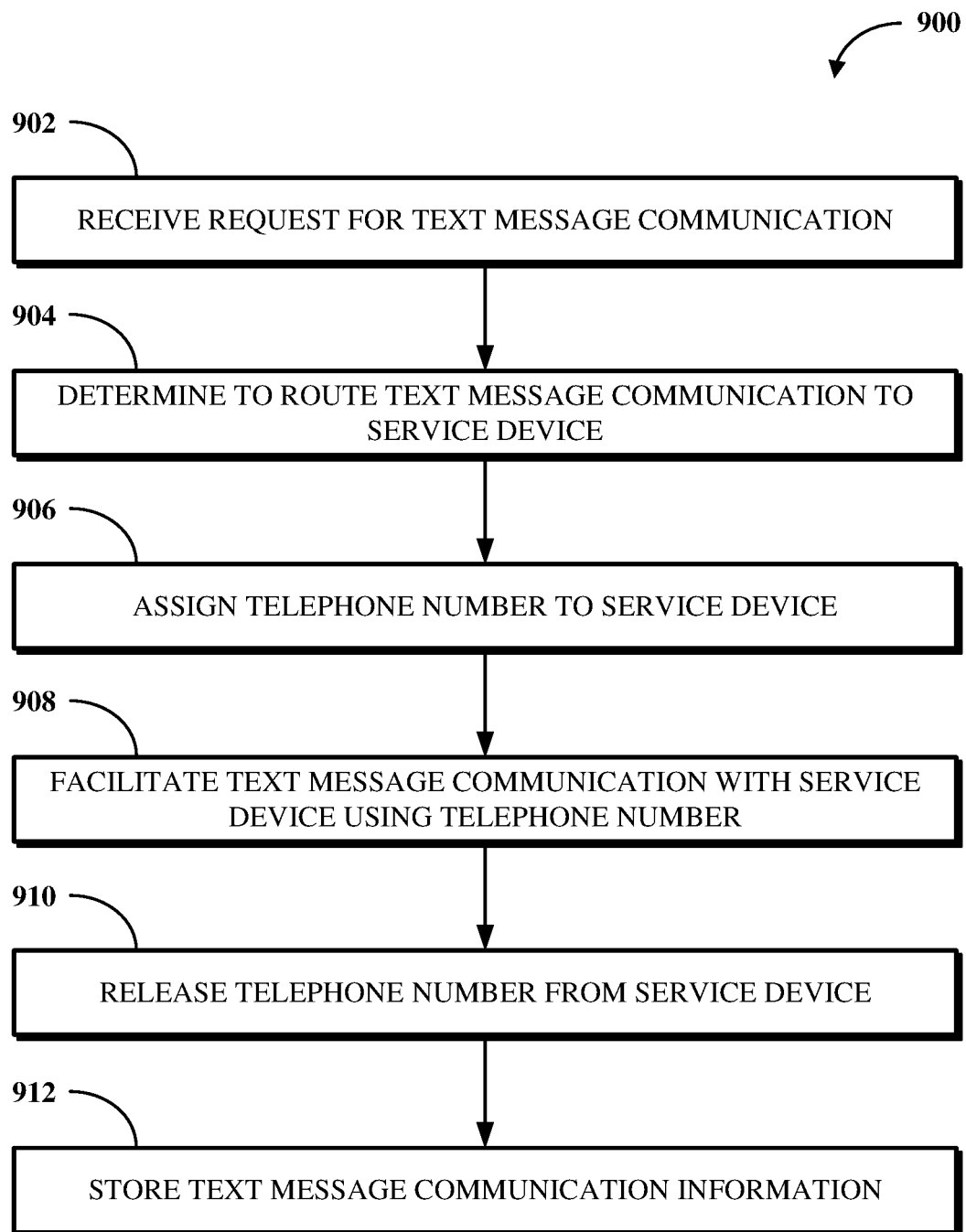
FIG. 9 is a flowchart of an example of a technique for telephone number assignment for text message communications.

To further describe some implementations in greater detail, reference is next made to examples of techniques which may be performed using telephone number assignment for text message communications. FIG. 9 is a flowchart of an example of a technique 900 for telephone number assignment for text message communications. The technique 900 can be executed using computing devices, such as the systems, hardware, and software described with respect to FIGS. 1-8. The technique 900 can be performed, for example, by executing a machine-readable program or other computer-executable instructions, such as routines, instructions, programs, or other code. The steps, or operations, of the technique 900 or another technique, method, process, or algorithm described in connection with the implementations disclosed herein can be implemented directly in hardware, firmware, software executed by hardware, circuitry, or a combination thereof.

For simplicity of explanation, the technique 900 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 902, a request for a text message communication is received. The request for a text message communication may be received in response to an operator of an operator device transmitting a text message from the operator device to a telephone number associated with a service, for example, a service associated with a software platform. Receiving the request for the text message communication can include detecting the request for the text message communication, for example, by determining that the request is a request for a text message communication.

At 904, a determination is made to route the text message communication to a service device, and the text message communication is routed to the service device based on the determination. The service device is one of one or more service devices for which the telephone number associated with the service is defined for use. The one or more service devices are used by operators. In one example, each of the one or more service devices is a device of a contact center agent. In such a case, each contact center agent may operate one or more of the service devices. In another example, each of the one or more service devices is a device of a service team member. For example, the service team may be a team of one or more device operators tasked with a particular service. In such a case, each service team member may operate one or more of the service devices.

Determining to route the text message communication to the service device first includes determining which one or more service devices are associated with the request for the text message communication. Determining which one or more service devices are associated with the request for the text message communication can include identifying the telephone number to which the request for the text message communication was transmitted and identifying a service associated with that telephone number. The one or more service devices are associated with that service.

Determining to route the text message communication to the particular service device may in at least some cases include processing information received as input from an operator device associated with the text message communication and/or information associated with the operator device. Thus, the assignment of the telephone number to the particular service device may be based on a determination to route the text message communication to the service device based on information received as input from an operator device associated with the text message communication and/or information associated with the operator device itself. For example, the operator device may be a device which initiated the text message communication and from which some form of input has been provided. The input may, for example, be or include one or more of information indicating a greeting, a request for the text message communication, information specifying an identify of the operator of the operator device, information specifying an identity of a requested operator of a service device, information specifying content of the requested text message communication, or the like. In another example, the information may be a telephone number associated with the operator device, a serial number or MAC address of the operator device, or other information associated with the operator device.

Processing the information received from the operator device can in some cases include using keyword and context processing to understand a type of inquiry related to the text message communication. For example, where a determination is made that the request for the text message communication is related to a specific topic and a particular operator of a service device is skilled in that topic, the text message communication may be assigned to that service device operator. Alternatively, processing information received as input from the operator device can include using identity processing to identify an operator of a service device who previously interacted with the operator of the operator device, for example, during a previous text message communication. For example, where a determination is made that the request for the text message communication is from a particular operator device operator who has previously been assisted by a particular service device operator, the text message communication may be assigned to that service device operator. As a further alternative, processing the information received as input from the operator device can include indicating the request for the text message communication to the group of operators associated with the one or more service devices. For example, one of those service device operators can decide to accept the request for the text message communication.

In some implementations, determining to route the text message communication to the service device based on the information received as input from the operator device associated with the text message communication includes identifying a priority of the text message communication based on the information received as input received from the operator device. For example, the information received as input from the operator device may include language that triggers a high priority designation, such as to indicate an importance of the operator device or to indicate a heightened emotional state of the operator thereof. In some such implementations, upon determining that a request for a text message communication is high priority based on the information received as input from the operator device, the text message communication may be routed to a supervisor or other upper level operator role not immediately accessed in response to typical requests for text message communications.

At 906, the telephone number is assigned to the service device. The telephone number is assigned to the service device to enable the service device to use the telephone number to participate in the text message communication. In particular, the assignment of the telephone number to the service device configures the service device to send and receive text messages using the telephone number. The assignment of the telephone number to the service device may be in addition to any telephone number or numbers already made available for use with the service device either by a PSTN or through a VOIP software application. Alternatively, the assignment of the telephone number to the service device may be in place of such a telephone number already made available for use with the service device. The telephone number is assigned to the service device based on the request for the text message communication. For example, the telephone number may be assigned to the service device based on the determination to route the text message communication to the service device.

In some implementations, the operator of the service device may accept the assignment of the telephone number before the telephone number is assigned to the service device. For example, after the determination is made to route the text message communication to the service device, a request for the operator to participate in the text message communication may be transmitted to the service device. The assignment of the telephone number to the service device may thus occur after the operator of the service device accepts the request to participate in the text message communication.

In some such implementations, a variable timer, which may have a default or customized value, may be used to measure a period of time to wait for the operator of the service device to accept the request to participate in the text message communication. For example, after the determination is made to route the text message communication to the service device, a timer may begin counting an amount of time which has elapsed without the operator of the service device responding to the request to participate in the text message communication. The timer may, for example, be configured to count up to a certain value, which may be a default value generally set for such requests for service device operators to participate in a text message communication or may instead be customized, such as based on a priority level of the operator of the operator device, a service associated with the service operator, and/or other criteria. Where the amount of time counted by the timer exceeds the default or customized value, the request to participate in the text message communication is revoked, and the technique 900 repeats the operations for determining the service device to which to route the request for the text message communication from the operator device. Where such determining operations are repeated, the service device of the operator who did not respond to the request to participate in the text message communication may be removed from the pool of service devices to evaluate for the purpose of routing the request for the text message communication.

At 908, the text message communication is facilitated with the service device using the telephone number. Facilitating the text message communication includes using telephony services to enable the service device and the operator device to send text messages to one another and to receive text messages from one another. The text message communication may be facilitated using the same software application at both of the service device and the operator device. Alternatively, a first software application for text messaging may be used at the operator device and a different, second software application for text messaging may be used at the service device.

In some implementations, one or both of notifications or messages unrelated to the text message communication at the service device may be suspended at the service device while the service device participates in the text message communication. For example, a server device from which the telephone number is assigned to the service device and/or which implements software for facilitating the text message communication between the service device and the operator device can cause software running on the service device to suspend notifications from being output at the service device and/or messages unrelated to the text message communication from being viewed and/or indicated at the service device. For example, the server device may transmit data that when processed at the service device configures then service device to act accordingly.

At 910, the telephone number is released from the service device. The telephone number is released at a conclusion of the text message communication. The conclusion of the text message communication may refer to a point (e.g., in time) at which the text message communication ends. For example, software which facilitates the text message communication may determine that the text message communication has ended based on one or more of a learning model which uses keyword and/or context information derived from the text message communication, input from one or both of the operator of the operator device or the operator of the service device, or another manner for deducing that the conversation which is the subject of the text message communication has concluded.

Alternatively, the conclusion of the text message communication may refer to a point at which the operator device leaves the text message communication. As a further alternative, the conclusion of the text message communication may refer to a point at which the service device leaves the text message communication. A device (e.g., the operator device or the service device) may be considered to leave a text message communication when text messaging software running at device being is closed, the device is powered off or restarted, the device loses telephony connectivity, or upon another event which temporarily disrupts or permanently prevents the device from sending or receiving text messages.

The release of the telephone number enables one of the other service devices of the one or more service devices to use the telephone number, for example, to send and receive text messages from that telephone number. Releasing the telephone number includes causing a configuration of the service device to restrict the service device from sending or receiving text messages from the telephone number. The releasing may be manually triggered by an action taken at the service device. Alternatively, the releasing may be automated based on a determination that the text message communication has concluded, for example, based on software used to facilitate the text message communication.

In some cases, the telephone number may, upon release, be immediately assigned to one of the other service devices. For example, the release of the telephone number may be to transfer the text message communication from the operator of the service device to a different operator of one of the other service devices to continue the same text message communication at that other service device. In one example, where the text message communication is in connection with a service of a software platform, the operator of the service device may be a customer service agent working at or with a contact center for the software platform or another customer service agent, and the different operator of the other service device may be a manager. In such a case, releasing the telephone number at the conclusion of the text message communication to enable the other service device to use the telephone number may include assigning the telephone number to the other service device and continuing the text message communication at the other service device. In this way, an outbound number representing the telephone number is the same for both of the service device and the other service device during the text message communication.

In other cases, the telephone number may be released without immediate assignment to one of the other service devices. For example, the release of the telephone number may be in response to the end of the text message communication. The telephone number may thus be made available to any of the service devices for a next text message communication, for example, a second text message communication requested by an operator of the same operator device or other a different operator device sending a text message to the telephone number. In such a case, the telephone number may later be assigned to one of the other service devices to enable the other service device to use the telephone number to participate in a second text message communication.

Use of the telephone number by the other service devices is restricted while the telephone number is in use with the service device. The telephone number may be considered to be in use with the service device so as to restrict use of the telephone number by the other service devices from a point at which the telephone number is assigned to the service device to a point at which the telephone number is released from the service device. Alternatively, the telephone number may be considered to be in use with the service device so as to restrict use of the telephone number by the other service devices from a point at which the service device begins participating in the text message communication to a point at which the text message communication concludes. In either case, the restriction of the use of the telephone number by the other service devices refers at least to the inability of those other service devices to send and receive text messages using that telephone number.

At 912, information associated with the text message communication is stored within a record associated with the telephone number. The record includes information associated with one or more text message communications participated in by any of the one or more service devices using the telephone number. For example, the record may be some set of information which includes portions of text message communications or entire text message communications participated in using the telephone number from some point in the past to the present. Storing the information associated with the text message communication may include updating the record where such a record associated with the telephone number already exists. Alternatively, storing the information associated with the text message communication may include generating such a record where no such record associated with the telephone number exists.

In some implementations, some or all of two or more records, each associated with a different telephone number, can be combined based on a match of external party information. For example, there may be multiple telephone numbers defined for use by the service devices, or the telephone number may be defined for use with the service devices and a second telephone number may be defined for use with different devices. In either such case, at least a portion of the record associated with the telephone number which was assigned and released to result in the information associated with the text message communication being stored may be combined with at least a portion of a record associated with a different telephone number.

For example, the combining may be in response to a matching of external party information associated with both the text message communication participated in by the service device using the telephone number and a second text message communication participated in by the same service device, by another service device, or by a different device using the second telephone number. The external party information may include or refer to one or more of a telephone number of an operator device which participated in a text message communication, another identifier of such an operator device (e.g., an IP address, a MAC address, a serial number, or the like), a name of an operator of the operator device, a name of a customer associated with the operator device, or the like. Thus, in some implementations, the matching of the external party information associated with both of the text message communications may be based on a determination that each of those text message communications was with the operator device.

Implementations of the technique 900 may omit certain steps or operations described above and/or include steps or operations beyond what are described above. In some implementations, the technique 900 may omit receiving the request for the text message communication. In some implementations, the technique 900 may omit determining to route the text message communication to the service device. In some implementations, the technique 900 may omit facilitating the text message communication. In some implementations, the technique 900 may omit storing the information associated with the text message communication within the record associated with the telephone number.

In some implementations, the technique 900 may include enabling an audit of the information associated with the text message communication using an audit device. For example, the audit may include a review of the record associated with the telephone number. An operator of an audit device, which may be one of the service devices for which the use of the telephone number is defined or another device, may have access privileges to read, write, and/or delete portions of a record associated with the telephone number or the entire record itself. The operator of the audit device may, for example, be a member of a quality assurance team, a supervisor of the group of service device operators or person otherwise acting in a supervisory role, or another person. The operator of the audit device may perform the audit to verify a course of action taken by a service device operator during a text message conversation, to review the dialogue of such a text message conversation, for other purposes, or a combination thereof.

In some implementations, the technique 900 may include transmitting an indication of the conclusion of the text message communication to a device associated with a second service. For example, the one or more service devices for which the telephone number is defined for use may be associated with a first service. The first service and the second service may be provided by a single team associated with a software platform or by different teams associated with the software platform. There may be many examples of the first service and the second service. In one non-limiting example, the first service may be provided by a customer service team associated with a software platform and the second service may be provided by a sales, marketing, or other team associated with the software platform.

In some such implementations, the technique 900 may include adding the device associated with the second service to the one or more service devices. Adding the device associated with the second service to the one or more service devices enables the device associated with the second service to use the telephone number to participate in text message communications. Thus, the telephone number may be assigned to the device associated with the second service once the device associated with the second service is added to the one or more service devices. The device associated with the second service may be added before or after the indication of the conclusion of the text message communication is transmitted.

In some implementations, the technique 900 may include indicating the use of the telephone number by the service device to the other service devices. For example, a message may be transmitted to or otherwise made accessible for the other service devices to indicate that the telephone number is in use with the service device at a given time. In some such implementations, the message may instead be represented as an inability of other service device operators to assign the telephone number to themselves or to otherwise be assigned the telephone number. In some such implementations, the technique 900 may further include indicating the release of the telephone number from the service device to enable another service device to use it to participate in the same text message communication or in another text message communication.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
    receiving a request for a text message communication;
    assigning a telephone number defined for use with one or more service devices to one of the service devices based on the request to enable the service device to use the telephone number to participate in the text message communication, wherein use of the telephone number by other service devices of the one or more service devices is restricted while the telephone number is in use with the service device; and
    releasing the telephone number at a conclusion of the text message communication to enable one of the other service devices to use the telephone number.

2. The method of claim 1, wherein the conclusion of the text message communication represents a point at which the service device leaves the text message communication, and wherein releasing the telephone number at the conclusion of the text message communication to enable the other service device to use the telephone number comprises:
    assigning the telephone number to the other service device; and
    continuing the text message communication at the other service device, wherein an outbound number representing the telephone number is the same for both of the service device and the other service device during the text message communication.

3. The method of claim 1, wherein the conclusion of the text message communication represents an end of the text message communication, and wherein the method further comprises:
    assigning the telephone number to the other service device to enable the other service device to use the telephone number to participate in a second text message communication.

4. The method of claim 1, further comprising:
    storing information associated with the text message communication in a record associated with the telephone number, wherein the record includes information associated with one or more text message communications previously participated in by any of the one or more service devices using the telephone number.

5. The method of claim 4, wherein the telephone number is a first telephone number, and wherein the method further comprises:

combining at least a portion of the record associated with the first telephone number and at least a portion of a record associated with a second telephone number responsive to matching external party information associated with both the text message communication and a second text message communication participated in using the second telephone number.

6. The method of claim 5, wherein the external party information includes a telephone number of an operator device, and wherein the method further comprises:
matching the external party information associated with both the text message communication and the second text message communication based on a determination that each of the text message communication and the second text message communication were with the operator device.

7. The method of claim 4, wherein the method further comprises:
enabling an audit of the information associated with the text message communication using an audit device, wherein the audit includes a review of the record associated with the telephone number.

8. The method of claim 1, wherein the assignment of the telephone number to the service device is based on a determination to route the text message communication to the service device based on information received as input from an operator device associated with the text message communication.

9. The method of claim 8, wherein determining to route the text message communication to the service device based on the information received as input from the operator device associated with the text message communication comprises:
identifying a priority of the text message communication based on the information received as input received from the operator device; and
determining to route the text message communication to the service device based on the priority of the text message communication.

10. The method of claim 1, wherein the one or more service devices are associated with a first service, and wherein the method further comprises:
transmitting an indication of the conclusion of the text message communication to a device associated with a second service.

11. The method of claim 10, further comprising:
adding the device associated with the second service to the one or more service devices before or after the indication of the conclusion of the text message communication is transmitted.

12. A system, comprising:
one or more service devices for which a telephone number is defined for use; and
a server device running software configured to:
assign the telephone number to one of the service devices to enable the service device to use the telephone number to participate in a text message communication;
facilitate the text message communication between the service device and an operator device, wherein use of the telephone number by other service devices of the one or more service devices is restricted while the telephone number is in use with the service device; and
release the telephone number at a conclusion of the text message communication to enable one of the other service devices to use the telephone number.

13. The system of claim 12, wherein the software is configured to store information associated with the text message communication in a record associated with the telephone number, wherein the record includes information associated with one or more text message communications previously participated in by any of the one or more service devices.

14. The system of claim 13, wherein the software is configured to enable an audit of the information associated with the text message communication by a review of the record associated with the telephone number.

15. The system of claim 12, wherein the software is configured to indicate the use of the telephone number by the service device to the other service devices.

16. The system of claim 12, wherein the software is configured to cause a suspension of one or both of notifications or messages unrelated to the text message communication at the service device while the service device participates in the text message communication.

17. An apparatus, comprising:
a memory; and
a processor configured to execute instructions stored in the memory to:
receive a request for a text message communication;
route the text message communication to a service device based on information associated with the request, wherein the service device is one of one or more service devices for which a telephone number is defined for use;
assign the telephone number to the service device to enable the service device to use the telephone number to participate in the text message communication; and
release the telephone number at a conclusion of the text message communication to enable one of the other service devices to use the telephone number.

18. The apparatus of claim 17, wherein use of the telephone number by other service devices of the one or more service devices is restricted while the telephone number is in use with the service device.

19. The apparatus of claim 17, wherein the instructions include instructions to:
store information associated with the text message communication in a record associated with the telephone number.

20. The apparatus of claim 17, wherein the instructions to route the text message communication to the service device based on the information associated with the request include instructions to:
identify a priority of the text message communication based on the information associated with the request.

* * * * *